United States Patent [19]

Iida et al.

[11] Patent Number: 4,985,611

[45] Date of Patent: Jan. 15, 1991

[54] WELDING EQUIPMENT

[75] Inventors: Hajime Iida; Tadashi Nakamura, both of Koga, Japan

[73] Assignee: Takao Kinzoku Kogyo Co., Ltd., Shiga, Japan

[21] Appl. No.: 218,393

[22] Filed: Jul. 13, 1988

[51] Int. Cl.$^5$ ..................... B23K 11/11; B23K 11/31
[52] U.S. Cl. ..................................... 219/87; 219/86.25
[58] Field of Search ............................... 219/87, 86.25

[56] References Cited

U.S. PATENT DOCUMENTS

| | | | |
|---|---|---|---|
| 2,242,867 | 5/1941 | Martin | 219/86.25 |
| 2,378,697 | 6/1945 | Geibel | 219/87 |
| 2,714,150 | 7/1955 | Kaiser | 219/4 |
| 2,832,882 | 4/1958 | Bieri | 219/89 |
| 4,135,076 | 1/1979 | Beneteau | 219/89 |

*Primary Examiner*—Bruce A. Reynolds
*Assistant Examiner*—Scott A. Rogers
*Attorney, Agent, or Firm*—Armstrong, Nikaido, Marmelstein, Kubovcik

[57] ABSTRACT

A welding equipment which has an upper frame which moves relative to a fixed lower frame. The movable upper frame has a plurality of upper mounting blocks and a plurality of upper electrode rods respectively mounted on the plurality of upper mounting blocks. The fixed lower frame is oppositely disposed below the movable upper frame, and has a plurality of lower mounting blocks and a plurality of lower electrode rods respectively mounted on the plurality of lower mounting blocks. A welding transformer is mounted on the movable upper frame and has cables operably connected to the upper electrode rods for supplying current thereto. Each of the plurality of upper electrode rods reciprocally moves relative to a respective one of the upper mounting blocks.

17 Claims, 4 Drawing Sheets

WELDING EQUIPMENT

BACKGROUND AND SUMMARY OF THE INVENTION:

This invention relates to a welding equipment.

A welding equipment which permits welding to be simultaneously done on a work at a plural number of spots, using a plurality of electrode rods, requires a large press for making up-down movement of each electrode rod as well as applying pressuring force on the work, resulting in a large equipment as a whole and high cost. If tips of electrode rods have been unevenly worn, each electrode rod will not apply the specified pressing force on the work, yielding improperly welded portions.

And the transformer for supplying current to electrode rods was not provided on the press, but was fixed on another member. Accordingly, the cables conductively connecting the transformer and electrode rods are required to be long, resulting in high cost, large voltage drop and lower efficiency. Moreover, as the press is moved, the cables are also moved therewith, giving rise to cutback on useful life in service of said cables.

Against this background, it is an object of this invention to have a compact equipment and provide a welding equipment which would not produce defective weld portions, even if respective electrode rods' tips were uneven.

Another object of this invention is to provide a welding equipment in which the length of the cables connected to electrode rods may be minimized, thereby reducing voltage drop, and moreover, said cables' useful life in service is prolonged.

Still another object of this invention is to provide a welding equipment in which a material which is not susceptible to electrolytic corrosion nor to deformation and abrasion is used for movably contacting portions of electrode rods.

Other objects, characteristic features and benefits of this invention will become more evident from the following detailed description taken in conjunction with appended drawings.

DESCRIPTION OF THE PREFERRED EMBODIMENTS

The present invention is described in detail hereunder with reference to the accompanying drawings.

Figure 1:
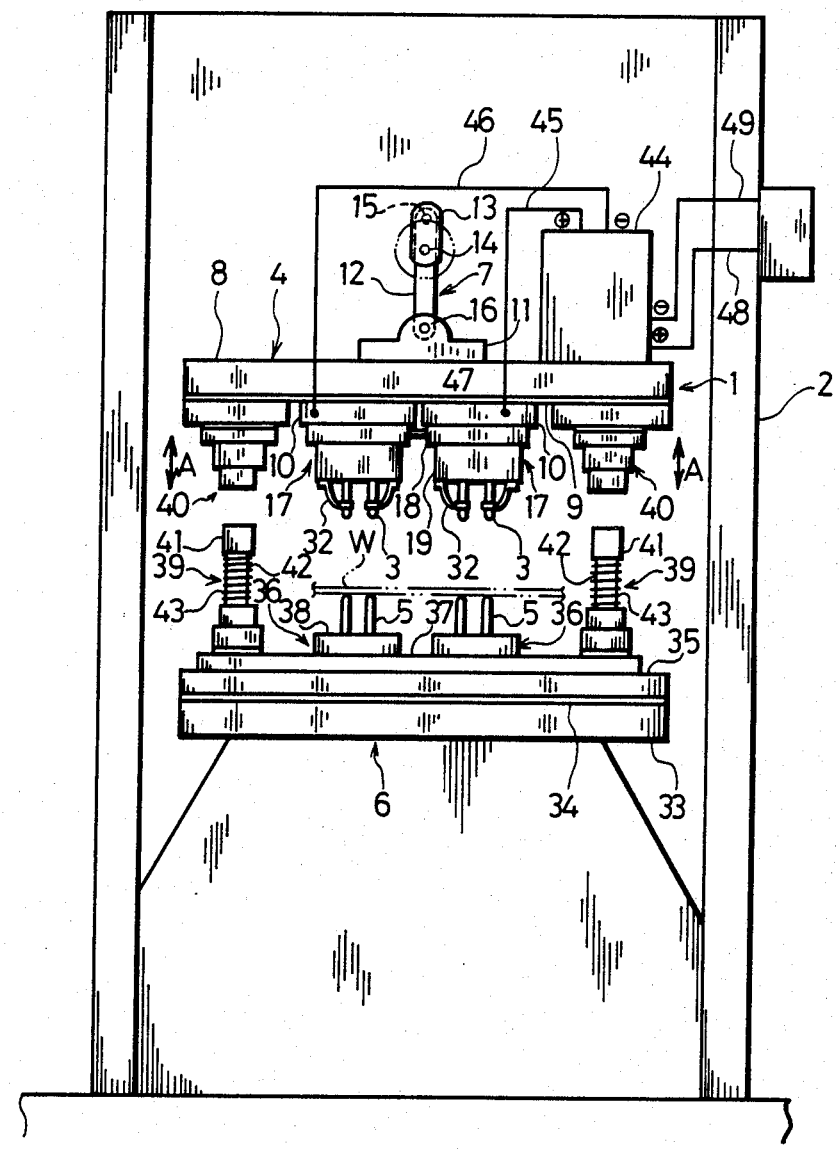
FIG. 1 is a schematic front view of a welding equipment showing a working example of this invention.
Figure 2:
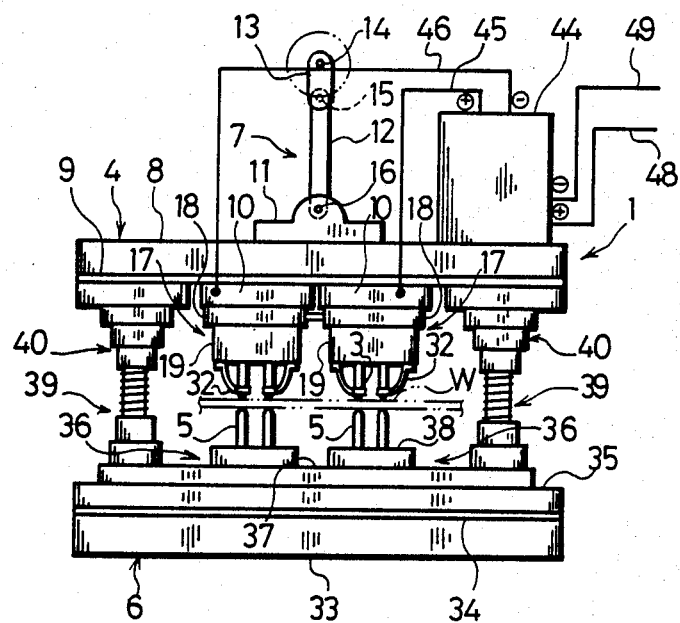
FIG. 2 is a partly omitted front view of such a welding equipment, while in operation.

In FIG. 1, 1 denotes a press which is contained in a base frame and which is equipped with an upper frame 4 on which there are mounted a plurality of upper electrode rods 3 . . . and a lower frame 6 on which there are mounted a plurality of lower electrode rods 5.

The upper frame 4 is vertically movable through a crank mechanism 7 provided on said upper frame 4 and comprises a bed plate 8 to which is coupled said crank mechanism 7 and an electrode plate 10 which is placed below the bottom of said base plate 8, with an insulating plate 9 interposed therebetween.

The crank mechanism 7 consists of a crank arm 13 with its one end swingably pivoted on a pivotally supporting shaft 14 positioned upward of the upper frame 4 and a connecting rod 12 with its one end swingably pivotally linked to the other end of said crank arm 13 through a swingable shaft 15, while its other end is swingably pivotally linked to the upper frame through a pivotally supporting shaft 16. Thus by means of a driving member such as a hydraulic motor, etc., not shown in the drawing, the crank arm 13 is rotated, centering on the pivotal shaft 14, as shown by an imaginary line, causing the upper frame 4 to vertically move, as shown by arrows, between the diameter ends of the circle indicated by an imaginary line. Accordingly, the upper frame 4 is brought to its highest position, when the pivotal shaft 15 is at its highest position (upper dead point) and said upper frame 4 is brought to its lowest position, when the pivotal shaft 15 is at its lowest position (lower dead point). When the upper frame 4 is at its highest and lowest positions, the connecting rod 12 and the crank arm 13 are placed in their vertical aligned posture.

The electrode rods 3 . . . are fitted to the upper frame 4 through each upper electrode rods unit 17. The upper electrode rods unit 17 consists of a metal substrate 18 and an electrode rod fitting block 19 for fitting the electrode rods to said substrate 18, with the substrate 18 mounted on the bottom surface of the electrode plate 10 by means of fixtures comprising a plurality of fixing screws, not shown in the drawing.

Figure 3:
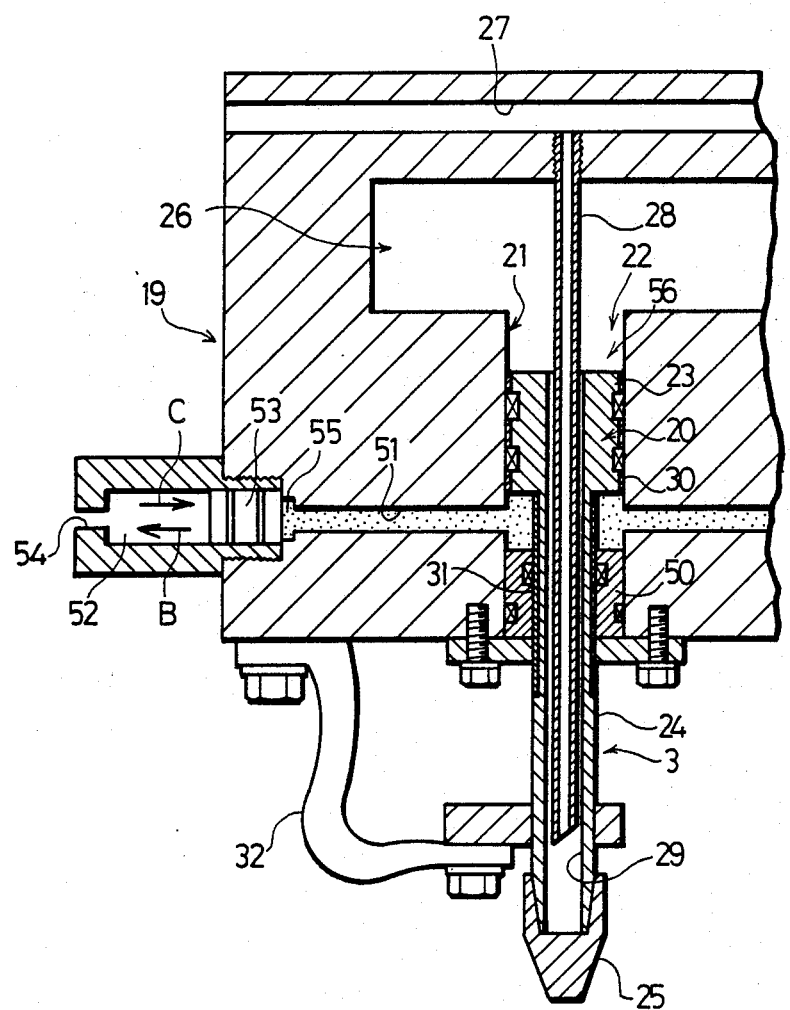
FIG. 3 is an enlarged sectional view of an enlarged sectional view of an electrode rod.

The electrode rod 3 is supported in a mounting block 19 for reciprocal motion, by means of a cylindrical structure being an electrode rods reciprocally moving mechanism 56, as shown in FIG. 3. Thus the electrode rod 3 comprises a pipe shape electrode rod body made of chrome copper, etc., which has a large diameter root portion 23 and a tip member 25 fitted to the distal end of said electrode rod body 24 to cover the distal end opening portion of a through-bore 29 of said electrode rod body 24, with a movably contacting portion 30 made of a ceramic having electrically insulating, wear and heat resistant properties outserted on the peripheral surface of the large diameter root portion, thereby forming a piston part 20. The ceramic used should desirably be one of alumina having titania mixed therein. And this piston part 20 is slidably engaged in a cylindrical chamber 22 formed by the upper portion of the hole part 21 in the interior of the mounting block 19. And on the electrode rod body 24, a similar movably contacting member 31 to the aforementioned movably contacting member 30 is outserted. Further, downward of the aforementioned hole part 21, there is provided a cylindrical insertingly fit member 50 which permits sliding of the movably contacting member 31 of the electrode rod body 24 on the inside surface thereof.

Accordingly, at least one of the part of the electrode rod 3 making movable contact with the mounting block 19 and the movably contacting part of the mounting block which bears it may be made of ceramic having electrically insulative, wear and heat resistant properties. In this case, the electrode rod 3 side is made of ceramic. Inversely, it is also permissible to provide a movably contacting member made of ceramic on the internal surface of the insertingly fit part 50, besides providing a movably contacting member made of ceramic on the internal peripheral surface of the hole part 21.

Numeral 51 designates a hydraulic path communicated with the aforementioned hole part 21, which is communicated with a small cylindrical chamber 52 opened from the mounting block 19. And on the piston 53 inside said small cylindrical chamber 52, is normally imposed a constant air pressure through its opening portion 54; said piston 53 is normally urged by this air pressure toward the communicating port 55 of the hydraulic path, normally blocking said communicating port 55. In this hydraulic path 51, certain oil is sealed. Thus by this oil pressure, the electrode rod 3 is held at a position as shown in the drawing. Numeral 26 designates a pressure chamber communicated with the cylindrical chamber 22; 27, a lateral hole formed in the mounting block 19; and 28, a pipe planted through the wall part of the pressure camber 26, which is inserted through the through-bore 29 of the electrode rod body 24.

And the tip of the first electrode rod 3 is directly coupled to the mounting block 19 as the electrode through a conductive cable 32.

As water is let flow from the lateral hole 27 into the pressure chamber 26 through the through-bore 29 of the electrode rod body, the electrode rod 3 will go forward and the piston in the small cylindrical chamber 52 move as indicated by an arrow mark B. Then as the water is let flow out of the pressure chamber 26 to a fluid drain, not shown in the drawing, thereby releasing the pressure of water, the piston 53 will move under the hydraulic pressure as shown by the arrow mark C, and as a consequence, the electrode rod 3 will go back, returning to its former state, as shown in FIG. 3.

The lower frame 6, like the aforementioned upper frame 4, consists of a base plate 33 and an electrode plate 35 mounted on the top of said base plate 33 through an insulating plate 34, which frame is fixed on the base frame 2 at its lower position.

And the lower electrode rods 5 . . . are vertically paired respectively with the upper electrode rods 3 . . . and are mounted on the lower frame 6 through the lower electrode rod units 36. The lower electrode rod unit 36 consists of a substrate 37 made of a metal and a mounting block 38 for mounting the lower electrode rods 5 on said substrate 37, the substrate 37 being mounted on the upper surface of the electrode plate 35 by means of fixtures comprising a plurality of lock screws, etc., not shown in the drawing. It should be noted that the electrode rods 5 are fixed, that the number of pieces of electrode rod units 17, 36 provided are two each, as shown in this figure, and that 2 each electrode rods 3, 5 are respectively provided. And the substrate 37 serves both electrode rod units 36, 36 in common.

Numeral 39, 39 denote guide male portions, each of which is provided with a cylindrical body 42, mating member 41 provided at the top of said cylindrical body 42 and a spring member 43 outserted on said cylindrical body 42. And on the bottom of the insulating plate 9 of the upper frame 4, guide female parts 40, 40 are fitted. Accordingly, by means of these guide male parts 39 and guide female parts 40, mutual positioning of the upper and lower electrode rod units 17, 36 may be done exactly, and the fitting of these two units to respective electrode plates 10 and 35 may be facilitated.

On the top surface of the base plate 8 of the upper frame 4, there is installed a welding transformer 44 for supplying secondary current to the electrode rods 3, 5. The plus side of the secondary electrode of said transformer 44 and the electrode plate 10 on which the electrode rod unit 17, shown on the right side in this figure, is mounted are conductively linked through a cable 45, and the minus side of the secondary electrode of said transformer 44 and the electrode plate 10 on which the left side electrode rod unit 17 is mounted are likewise linked through another cable 46. Accordingly, the transformer 44 and cables 45 and 46 are provided on the upper frame or movable side of the press 1. It should be noted that the pressure chambers 26, 26 of the right and left electrode rod units 17, 17 are communicated by a communicating pipe 47, while said right and left electrode rod units 17, 17 are insulated. Further, there are continuity between the right and left electrode rod units 36, 36, but the guide male parts 39, 39 and the guide female arts 40, 40 are insulated from both electrode rod units 17, 36. Numerals 48, 49 are cables for supplying the primary current to the transformer 44.

Thus, as shown in FIG. 1, with a work w mounted on electrode rods 5, the upper frame 4 is lowered by the crank mechanism 7, while the electrode rods 3 . . . are forwarded by letting water flow into the pressure chamber 26 of the electrode of unit 17, to hold the work w between respective two electrode rods 3, 5 . . . at the lower most position of said upper frame 4, as well as applying a uniform pushing pressure on said work w from the water pressure inside the pressure chamber 26.

And under this state, as the secondary current is let flow from the transformer 44 to the right side electrode plate 10, said current will flow on the electrode rod 3 through the conductive cable 32, then, flowing to the electrode rod 5 of the right side electrode rod unit 36 through the work w. Further, said current will flow to the left side electrode rod 5 of the electrode rod unit 36, then, flowing to the electrode rod 3 of the left side electrode rod unit 17 through the work w. In that way, the welding is performed on the work w.

Figure 4:
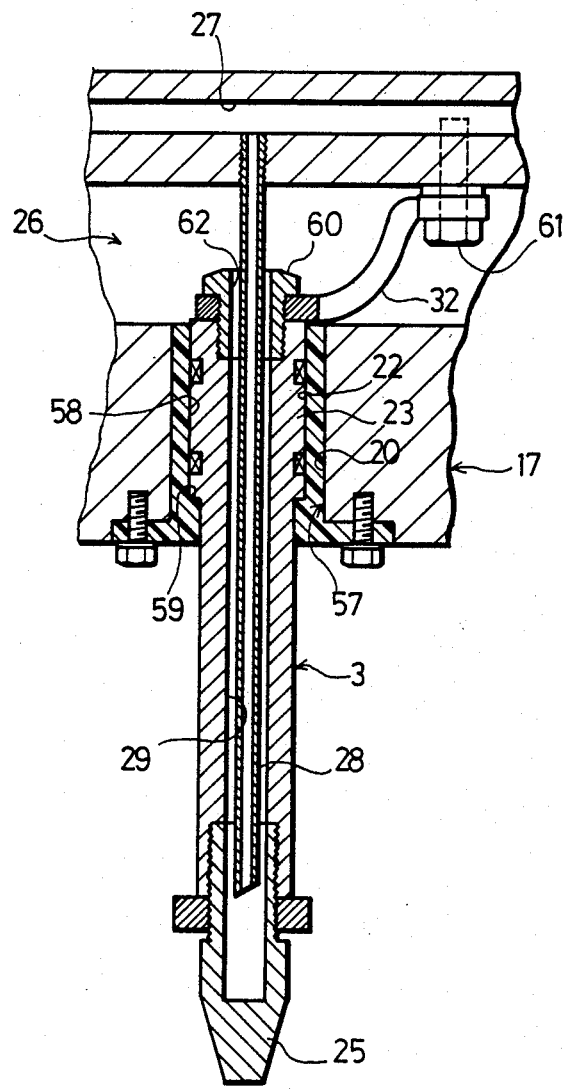
FIG. 4 is an enlarged sectional view of another working example of the electrode rod.

Then, FIG. 4 shows an alternative of the electrode rod 3; the large diameter root part 23 of this electrode rod 3 is slidably engaged in the hole part 58 of the movably contacting member 57 which is insertingly fit in the hole part 20 of the mounting block 17. Thus on the hole pat 58 of the movably contacting member 57, a steppted portion 59 is formed, thereby forming a cylindrical chamber with the part upward of said stepped portion 59, and this movably contacting member is formed of nylon or other synthetic fibers or hard synthetic resins which excel in heat and wear resistance. It may be also desirable to form this movably contacting member 57 with a ceramic having the aforementioned electrically insulating and wear and heat resistant properties.

In this instance, the root portion of the electrode rod 3 is linked to the inner wall of the pressure chamber 26 through a conductive cable 32. Thus one end of the cable 32 is securely set with a bolt 60 screwed into the upper end of the electrode rod 3, while the other end of said cable 32 is secured with the bolt 61 screwed into the inner wall of the pressure chamber 26. Through the bolt 60, an inserting hole 62 for inserting the pipe 28 is pierced.

Thus in this instance, after mounting the work w on the electrode rods 5 . . . , not only the upper frame 4 is lowered, but cooling water is let flow into the through-bore 29 of the electrode rod unit 17 and the pressure chamber 26, causing the electrode rod 3 to lightly abut on the work w, and then, the upper frame 4 is very slightly descended. Accordingly, even if the distal ends of electrode rods 5 (or the distal ends of respective tip members 25) are uneven one from another, because the pressure chamber 26 is communicated with the through-bore 29 of each electrode rod 3, the pushing pressure exerted by respective electrode rods 3 which will act on the work w will be equalized.

And if the secondary current is supplied through the transformer 44, the work w will be welded.

In the welding equipment of this invention, the vertical movement of the upper frame 4 is made by means of a crank mechanism 7 and the reciprocation of each electrode rod 3 . . . is conducted by an electrode reciprocally moving mechanisms 56 of a cylindrical structure; accordingly, for the driving power of the driving device such as a motor for driving this crank mechanism 7, the force required merely to move the upper frame 4 up-down is sufficient, thus permitting miniaturization of the driving device, leading to realization of a compact equipment as a whole. At the time of welding the work w, the upper frame 4 is brought to its lower most position, causing the connecting rod 12 and the crank arm 13 to be on the same vertical straight line, so that said crank mechanism 7 can bear the reactive force from the work w. Further, since each electrode rod is reciprocally movable, it is possible to equalize the pushing pressure applied on the work w thereby.

The cables 45, 46 themselves are kept in their stationary state relative to the movement of the movable side or the upper frame 4 of the press 1, while the whole assembly is moving; thus said cables will not undergo deformation. Accordingly, it is possible to prolong the useful life in service of said cables 44, 45, thus contributing to reduction in cost. (Heretofore, these cables have been used as consumable goods. The cables through which the primary current is supplied will move, following the movable side, but since the primary current is allowed to be small, use of these cables 49, 48 as consumable goods will not lead to elevated cost.) And with cables 44, 45 provided on the movable side, the length of said cables 44, 45 may be retrenched, thus further contributing to cost down and moreover, enabling curtailment of drop of secondary current.

Because the movably contacting parts of the electrode rod 3 which are making movable contact with the mounting block 19 or the movably contacting part of the mounting block 19 is made of ceramic, these movably contacting parts are insulated from each other, so that no electrolytic corrosion would take place between said movably contacting parts. Moreover, these parts will not undergo deformation due to the heat generated by welding, etc., nor are susceptible to abrasion, thus making this equipment highly duable.

This invention may be exercised by alternative methods without departing from its spirit and mandatory characteristic features. Accordingly, the preferable embodiments of this invention hereabove described in this specification are merely exemplary and not limitative.

For example, in the equipment illustrated in the drawings two pairs of electrode rod units 17 and 36 respectively are provided, but either one pair only or three or more pairs may be freely employed and the number of electrode rods 3, 5 installed on the respective units 17, 36 may be freely chosen, but they shall be limited to the upper and lower electrode rods 3 . . . , 5 . . . each corresponding ones of which are paired. Further two or more units of transformers may be freely used in correspondence with the electric capacity for welding.

We claim:

1. A welding equipment comprised of:
   a plurality of lower electrode rods erected on mounting blocks of a lower frame of a press,
   a crank mechanism provided on an upper frame of the aforementioned press to move said upper frame up-down,
   a plurality of upper electrode rods suspended from mounting blocks of the aforementioned upper frame, to hold a work between them and the aforementioned lower electrode rods at the lower most position of said upper frame, and
   an electrode reciprocally moving mechanism provided on the aforementioned upper frame, to reciprocally move the aforementioned electrode rods, so that each upper electrode will apply the specified pushing pressure on the aforementioned work at the lower most position of said upper frame.

2. The welding equipment according to claim 1, wherein the crank mechanism consists of a crank arm with its one end swingably pivoted at a position upward of the upper frame and a connecting rod with its one end pivotally linked to the other end of said crank arm, while its other end is swingably pivoted on a position of the aforementioned upper frame, and the connecting rod and the crank arm are brought to the same vertical position, when said upper frame is at its lower and upper most positions.

3. The welding equipment according to claim 1, wherein the tip part of each upper electrode rod is coupled through a conductive cable to the mounting block as an electrode.

4. The welding equipment according to claim 1, wherein the root part of each upper electrode rod is coupled to the mounting block as an electrode through a conductive cable which is contained in the mounting block.

5. The welding equipment according to claim 1, wherein the electrode rod reciprocally moving mechanism is provided as a cylindrical structure comprised of a cylindrical chamber provided in the upper frame and the large diameter root part of the upper electrode which slidably engages with said cylindrical chamber.

6. A welding equipment characterized in that electrode rods on one side of a plural number of pairs of electrode rods are reciprocally movably mounted on mounting blocks as electrodes and that the movably contacting parts of each electrode rod which make movable contact with said mounting block are formed of a ceramic which has electrically insulating and wear and hat resistant properties.

7. A welding equipment according to claim 6, wherein the ceramic is produced by mixing titania into alumina.

8. A welding equipment characterized in that electrode rods on one side of a plural number of pairs of electrode rods are reciprocally movably mounted on mounting blocks as electrodes, while the movably contacting parts of each mounting block which receive the electrode rods are formed of a ceramic having electrically insulating and wear and heat resistant properties.

9. A welding equipment according to claim 8, wherein the ceramic is produced by mixing alumina into titania.

10. A welding equipment comprising:

a movable upper frame having a plurality of upper mounting blocks and a plurality of upper electrode rods respectively mounted on said plurality of upper mounting blocks;

a fixed lower frame oppositely disposed below said movable upper frame having a plurality of lower mounting blocks and a plurality of lower electrode rods respectively mounted on said plurality of lower mounting blocks;

a means for moving said movable upper frame relative to said fixed lower frame;

a welding transformer means mounted on said movable upper frame having cables operably connected to said upper electrode rods for supplying current thereto;

a reciprocally moving means disposed within each of said plurality of upper electrode rods for reciprocally moving each upper electrode rod relative to a respective one of said upper mounting blocks.

11. A welding equipment according to claim 10, wherein said movable upper frame further includes an upper mounting plate, a plurality of upper electrode plates, and an upper insulating plate disposed between said upper mounting plate and said upper electrode plates, wherein said plurality of upper mounting blocks are respectively mounted on said upper electrode plates.

12. A welding equipment according to claim 10, wherein said fixed lower frame further includes a lower mounting plate, a lower electrode plate, and a lower insulating plate disposed between said lower mounting plate and said lower electrode plate, wherein said plurality of lower mounting blocks are respectively mounted on said lower electrode plate.

13. A welding equipment according to claim 10, wherein said reciprocally moving means includes a cylindrical chamber in said movable upper frame, and a piston portion in at least one of said upper electrode rods for slidably engaging with said cylindrical chamber.

14. A welding equipment according to claim 10, wherein said moving means includes a crank arm having one end thereof rotatably connected on said movable upper frame, and a connecting rod having one end rotatably connected on another end of said crank arm, wherein said connecting rod has another end rotatably connected to a pivotal shaft located above said movable upper frame.

15. A welding equipment according to claim 14, wherein said crank arm and said connecting rod are at the same vertical position when said movable upper frame is at its lowermost and uppermost positions relative to said fixed lower frame.

16. A welding equipment according to claim 13, wherein said piston portion has a contact portion for slidably engaging with an inner surface of said cylindrical chamber, wherein said contact portion is made of ceramic having an electrically insulating property and wear and heat resistant properties.

17. A welding equipment according to claim 16, wherein said ceramic is made from a mixture of titania and alumina.

* * * * *